(12) United States Patent
Brees et al.

(10) Patent No.: US 7,849,990 B2
(45) Date of Patent: Dec. 14, 2010

(54) ONE-WAY CLUTCH WITH DAMPENING

(75) Inventors: William Brees, Wooster, OH (US); Christopher Shamie, Wadsworth, OH (US); Philip George, Wooster, OH (US); Jeffrey Hemphill, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 682 days.

(21) Appl. No.: 11/796,316

(22) Filed: Apr. 27, 2007

(65) Prior Publication Data

US 2007/0251792 A1 Nov. 1, 2007

Related U.S. Application Data

(60) Provisional application No. 60/796,482, filed on May 1, 2006.

(51) Int. Cl.
*F16D 41/18* (2006.01)
*F16D 33/00* (2006.01)

(52) U.S. Cl. .......................................... 192/46; 60/345

(58) Field of Classification Search ................ 192/3.21; 60/345
See application file for complete search history.

(56) References Cited

U.S. PATENT DOCUMENTS 5,852,932 A * 12/1998 Matsumoto ................... 60/345
5,871,071 A * 2/1999 Sink ............................. 192/46
5,979,627 A    11/1999 Ruth et al.
2003/0146063 A1    8/2003 Yamada et al.

FOREIGN PATENT DOCUMENTS

JP          2003056605         2/2003
WO     WO 2003/087603         10/2003

* cited by examiner

*Primary Examiner*—David D Le
*Assistant Examiner*—Ryan Dodd
(74) *Attorney, Agent, or Firm*—Simpson & Simpson, PLLC

(57) ABSTRACT

The present invention broadly comprises a one-way clutch in an automotive drive component. In some aspect, the component is a stator and the clutch includes first, second, and third radially disposed elements. The first and second elements lockingly engage. The third element is between the first and second plates and hydraulically or mechanically dampens energy associated with the locking engagement. In some aspects, the third element forms structures to partially enclose torque converter fluid and one of the first or second elements rotates to causes displacement of the fluid. In some aspects, the clutch includes a fourth radially disposed element at least partially blocking openings in the first or second elements. In some aspects, the third element includes at least one elastically deformable extension and rotation of one of the first or second elements causes the first and second elements to compress the at least one elastically deformable extension.

22 Claims, 13 Drawing Sheets

ONE-WAY CLUTCH WITH DAMPENING

CROSS-REFERENCE TO RELATED APPLICATIONS

This application claims the benefit under 35 U.S.C. §119 (e) of U.S. Provisional Application No. 60/796,482 filed May 1, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a one-way clutch, with vibration dampening, in a stator for a torque converter. The clutch includes a dampening plate between engagement plates of the clutch to minimize impact, noise, and vibration associated with the transition from free-wheel mode to locked mode in the stator.

BACKGROUND OF THE INVENTION

FIGS. 13A through 13C are partial cross-sectional views of a one-way clutch without dampening. The following should be viewed in light of FIGS. 13A through 13C. One-way clutches are used in stators to rotationally disengage the blades of the stator from the shaft of the stator during a free-wheel mode and to rotationally lock the blades and the stator shaft during a locked mode. During the transition from the free-wheel mode to the locked mode, the stator changes from spinning (free-wheeling) to carrying torque. To lock the clutch, various components of the clutch are brought into contact. The impact associated with the contact can generate undesirable noise and vibration.

For example, in FIG. 13A, plate 802 is rotatable and includes openings 804. Plate 806 is rotatably fixed and includes protrusions 808. Plate 806 is urged in direction 809 by resilient means (not shown). In FIG. 13A, the clutch is in a free-wheel mode (plate 802 rotates in direction 810). Segments 816 of plate 802 engage segments 814 and plate 812 also rotates in direction 810. Intermediate plate 812 slides over plate 806 and protrusions 808 such that protrusions 808 do not engage openings 804.

In FIG. 13B, the clutch switches to a locking mode and plate 802 rotates in direction 818. As this rotation occurs, openings 820 in plate 812 begin to align with openings 804. Plate 812 rotates such that openings 804 and 820 align sufficiently to enable protrusions 808 to drop into openings 804. As the protrusions drop into openings 804, segments 814 engage the protrusions. In FIG. 13C, segments 816 rotate into segments 814 to lockingly engage plates 802 and 806. However, as segments 816 push into segments 814, the inertia or energy associated with plates 802 and 812 causes an undesirable vibration and noise. That is, there is little or no braking of the movement of plates 802 and 812 into plate 806.

The magnitude of the energy, and hence the magnitude of the noise and vibration, is related to the lash associated with the movement of the components during the transition. It is known to include counteracting components within the clutch to minimize the lash. These components entail a high degree of precision to function properly. Unfortunately, this degree of precision can be much greater than or even incompatible with the precision associated with the remaining components in the clutch. For example, stamped components in a clutch can greatly reduce the cost and complexity of the clutch. However, it may be difficult or even impossible to incorporate the counteracting components noted above using stamped components.

Thus, there is a long-felt need for a means of reducing noise and vibration in a one-way stator clutch while simultaneously enabling the use of more cost-effective processes, configurations, and components.

BRIEF SUMMARY OF THE INVENTION

The present invention broadly comprises a one-way clutch in a stator for a torque converter including a first radially disposed element rotationally fixed with respect to a longitudinal axis for the stator, a second radially disposed element rotatable about the axis and arranged to lockingly engage with the first element in a first rotational direction, and a third radially disposed element rotatable about the axis and axially disposed between the first and second elements. The third element is arranged to dampen energy associated with the locking engagement. In some aspects, the third radially disposed element is arranged to provide hydraulic dampening, the torque converter includes fluid, and the third element comprises a substantially radially disposed segment axially displaced from the third element and arranged to partially enclose a portion of the fluid in conjunction with the third element. The second element is arranged such that the rotation of the second element in the first direction causes substantial displacement of the portion of the fluid during the engagement.

In some aspects, one of the first or second elements further comprises at least one first opening and first and second axially-facing sides, a portion of the third element is disposed in the at least one first opening, the third element is proximate the first axially-facing side, and the radially disposed segment is proximate the second axially-facing side. In some aspects, the clutch includes a fourth radially disposed element, one of the first or second elements further comprises at least one second opening, and the fourth element at least partially blocks the at least one second opening. In some aspects, the fourth element is connected to the third element. In some aspects, the one of the first or second elements further comprises third and fourth axially-facing sides, the third element is disposed proximate the third axially-facing side, and the fourth element is disposed proximate the fourth axially-facing side. In some aspects, the fourth element further comprises at least one third opening, the third element further comprises at least one tab, and the at least one tab is disposed in the at least one third opening.

In some aspects, the third radially disposed element is arranged to provide mechanical dampening, the third element further comprises at least one elastically deformable extension, and the second element is arranged such that the rotation of the second element in the first direction causes the first and second elements to compress the at least one elastically deformable extension. In some aspects, the first element further comprises at least one fourth opening with a first side and the second element is arranged to urge the at least one elastically deformable extension against the first side or the second element further comprises at least one fifth opening with a second side and the second side is arranged to urge the at least one elastically deformable extension against the first element.

In some aspects, at least one of the first, second, third, or fourth elements is formed by stamping.

The present invention also broadly comprises a one-way clutch in a stator for a torque converter including a first radially disposed element with at least one opening, a second radially disposed element with at least one protrusion arranged to lockingly engage with the first element in a first rotational direction, and a third radially disposed element. The third element is rotatable about a longitudinal axis for the stator, axially disposed between the first and second plates, and arranged to provide hydraulic dampening of energy associated with the engagement. The third element forms a structure partially enclosing a portion of fluid in the torque converter, one of the first or second elements is rotationally fixed with respect to the axis, the other of the first or second elements is rotatable about the axis, and the rotation of the other is arranged to substantially displace the portion of the fluid during the engagement.

The present invention further broadly comprises a one-way clutch in a stator for a torque converter including a first radially disposed element with at least one opening, a second radially disposed element with at least one protrusion arranged to lockingly engage with the first element in a first rotational direction, and a third radially disposed element, The third element is rotatable about a longitudinal axis for the stator, axially disposed between the first and second plates, and arranged to provide hydraulic dampening of energy associated with the engagement. The clutch also includes a fourth radially disposed element connected to the third element such that the fourth element at least partially blocks the at least one opening. One of the first or second elements is rotationally fixed with respect to the axis, the other of the first or second elements is rotatable about the axis, and the rotation of the other is arranged to substantially displace the portion of the fluid disposed between the third and fourth elements during the engagement.

As well, the present invention broadly comprises a one-way clutch in a stator for a torque converter including a first radially disposed element with at least one opening, a second radially disposed element with at least one protrusion arranged to lockingly engage with the first element in a first rotational direction, and a third radially disposed element. The third element is rotatable about a longitudinal axis for the stator, axially disposed between the first and second plates, and arranged to provide mechanical dampening of energy associated with the engagement. The third element comprises at least one elastically deformable extension, one of the first or second elements is rotationally fixed with respect to the axis, the other of the first or second elements is rotatable about the axis, and the rotation of the other is arranged to cause the first and second elements to compress the at least one elastically deformable extension.

The present invention broadly comprises a one-way clutch in an automotive drive component including a first element rotationally fixed with respect to an axis for the component and with at least one first locking feature and a second element rotatable about the axis and with at least one second locking feature. The first and second locking features are arranged to lockingly engage in a first rotational direction to rotationally lock the first and second elements in the first rotational direction. The clutch is arranged to hydraulically dampen an impact of the first and second locking features during the locking engagement. In some aspects, the first locking feature is an opening or an indentation and the second locking feature is a protrusion.

In some aspects, the first element is a first radially disposed element and the second element is a second radially disposed element and the clutch includes a third radially disposed element rotatable about the axis, axially disposed between the first and second elements, and configured to provide the hydraulic dampening. In some aspects, the drive component includes fluid, the third element includes a substantially radially disposed segment axially displaced from the third element and arranged to partially enclose a portion of the fluid in conjunction with the third element. The second element is arranged such that the rotation of the second element in the first direction causes substantial displacement of the portion of the fluid during the engagement.

In some aspects, the clutch includes a fourth radially disposed element and one of the first or second elements includes at least one second opening and the fourth element at least partially blocks the second opening. In some aspects, one of the first or second elements includes third and fourth axially-facing sides, the third element is disposed proximate the third axially-facing side, and the fourth element is disposed proximate the fourth axially-facing side.

In some aspects, the clutch includes fifth and sixth radially disposed elements and fluid. The first and second elements are axially disposed between the fifth and sixth radially disposed elements and the fifth and sixth radially disposed elements are arranged to at least partially trap the fluid between the first and second locking features.

In some aspects, the component is a transmission, an auxiliary drive unit, or a torque converter. For a torque converter, the clutch can be a stator one-way clutch.

The present invention also broadly comprises a one-way clutch in an automotive drive component including a first radially disposed element rotationally fixed with respect to an axis for the component and with at least one first locking feature, a second radially disposed element rotatable about the axis and with at least one second locking feature, and a third radially disposed element rotatable about the axis and axially disposed between the first and second elements. The first and second locking features are arranged to lockingly engage in a first rotational direction to rotationally lock the first and second elements in the first rotational direction, and the third plate is arranged to mechanically dampen an impact of the first and second locking features during the locking engagement. In some aspects, the third element includes at least one elastically deformable extension and the second element is arranged such that the rotation of the second element in the first direction causes the first and second elements to compress the elastically deformable extension.

In some aspects, the first element includes at least one first opening with a first side and the second element is arranged to urge the at least one elastically deformable extension against the first side. In some aspects, the second element includes at least one second opening with a second side and the second side is arranged to urge the at least one elastically deformable extension against the first element.

It is a general object of the present invention to provide a one-way clutch in an automotive drive component that produces minimal vibration and noise when shifting to a locked mode.

It is another general object of the present invention to provide a one-way clutch in a stator that produces minimal vibration and noise when shifting to a locked mode.

It is yet another object of the present invention to provide a one-way clutch in a stator with dampening between components used to transfer torque during a locked mode.

It is a further object of the present invention to use stamped parts in a one-way clutch to provide an assembly that produces minimal vibration and noise when the stator changes to a locked mode.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
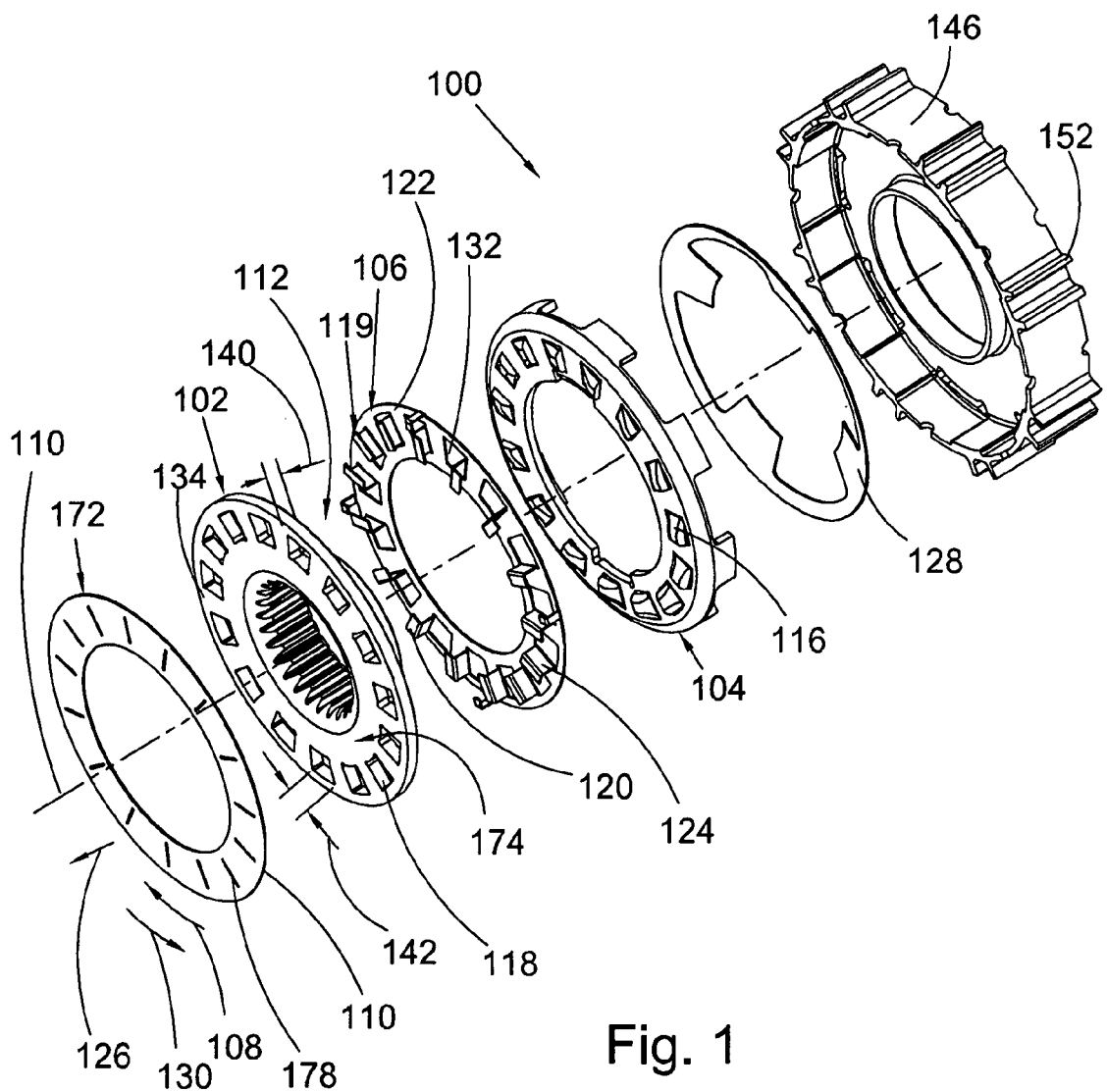
FIG. 1 is a back exploded view of a present invention one-way clutch.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

"Front" refers to an axial orientation facing an engine to which a torque converter is connected and "back" refers to an axial orientation facing a transmission to which the torque converter is connected. It should be understood that the meanings of these terms can be reversed. It also should be understood that a present invention clutch is not limited to the axial orientation shown in the figures. For example, for a same engine and transmission configuration, the orientation can be axially reversed.

In some aspects, a present invention one-way clutch in an automotive drive component includes the basic configuration of a first element rotationally fixed with respect to an axis for the component and with at least one first locking feature and a second element rotatable about the axis and with at least one second locking feature. As is generally the case for a one-way clutch, the first and second locking features are arranged to lockingly engage in a first rotational direction to rotationally lock the first and second elements in the first rotational direction. The elements can be axially separated or radially separated. In the first case, the locking features are typically axially displaced with respect to each other and in the second case, the locking features are typically radially displaced with respect to each other. Further, the clutch is arranged to hydraulically dampen the impact of the first and second locking features during the locking engagement. In some aspects, the first and second elements are both rotatable about the axis.

In some aspects, the first locking feature is an opening or indentation and the second locking feature is a protrusion, for example, a ramp. In general, the discussions in the descriptions of the figures that follow are applicable to the aspects in which the first and second elements are axially separated. By axial, we mean parallel to a longitudinal axis for the clutch. That is, the separation between the elements is in an axial direction. For those aspects in which the first and second elements are radially separated, the clutch includes two radially disposed elements. By radial, we mean parallel to a radius for the longitudinal axis. Thus, the separation between the first and second elements is in a radial direction. The first and second elements are axially disposed between the radially disposed elements and the radially disposed elements are arranged to at least partially trap the fluid in the component between the first and second locking features. For example, the first and second elements and locking features form at least portions of the circumferential sides of pockets and the radially disposed elements form at least portions of the radial sides of the pockets. By circumferential, we mean defined by a uniform distance from the longitudinal axis. For example, the end of a radius for the axis describes a circumferential line. The pockets trap the fluid and as the locking features begin to engage, the features must displace the fluid in the pockets. The radially disposed elements hinder the flow of fluid from between the locking features, increasing the energy needed to displace the fluid. The expenditure of energy from the rotating element to displace the fluid dampens the impact of the features. This fluid displacement process is similar to that described in the figures below.

The component can be any automotive drive component, including, but not limited to a transmission and an auxiliary drive unit, for example, to power an air conditioner while a drive unit in a vehicle is shut-off. A present invention one-way clutch can be used for any one-way clutch application in a torque converter. In some aspects, the one-way clutch is a stator one-way clutch as described in the figures that follow.

In some aspects, a present invention one-way clutch in an automotive drive component includes the basic configuration of a first radially disposed element rotationally fixed with respect to an axis for the component and having first locking features and a second radially disposed element rotatable about the axis and having second locking features. As is generally the case for a one-way clutch, the first and second locking features are arranged to lockingly engage in a first rotational direction to rotationally lock the first and second elements in the first rotational direction. The clutch also includes a third radially disposed element, axially disposed between the first and second elements and arranged to mechanically dampen energy associated with the locking engagement. In some aspects, the third element includes at least one elastically deformable extension and the second element is arranged such that the rotation of the second element in the first direction causes the first and second elements to compress the at least one elastically deformable extension. This elastic deformation process is similar to that described in the figures below.

The figures and descriptions that follow are directed to a present invention one-way clutch in a torque converter, however, it should be understood that the figures and descriptions are generally applicable to a present invention one-way clutch in an automotive drive component as described supra. That is, the one-way clutches shown in the figures are in general applicable to an automotive drive component other than a torque converter, for example, a transmission or an auxiliary drive unit. Alternately stated, the hydraulic or mechanical dampening of a one-way clutch and the configuration of one-way clutch components shown in the figures and discussed in the descriptions of the figures are applicable to an automotive drive component other than a torque converter, for example, a transmission or an auxiliary drive unit.

FIG. 1 is a back exploded view of present invention one-way clutch 100.

Figure 2:
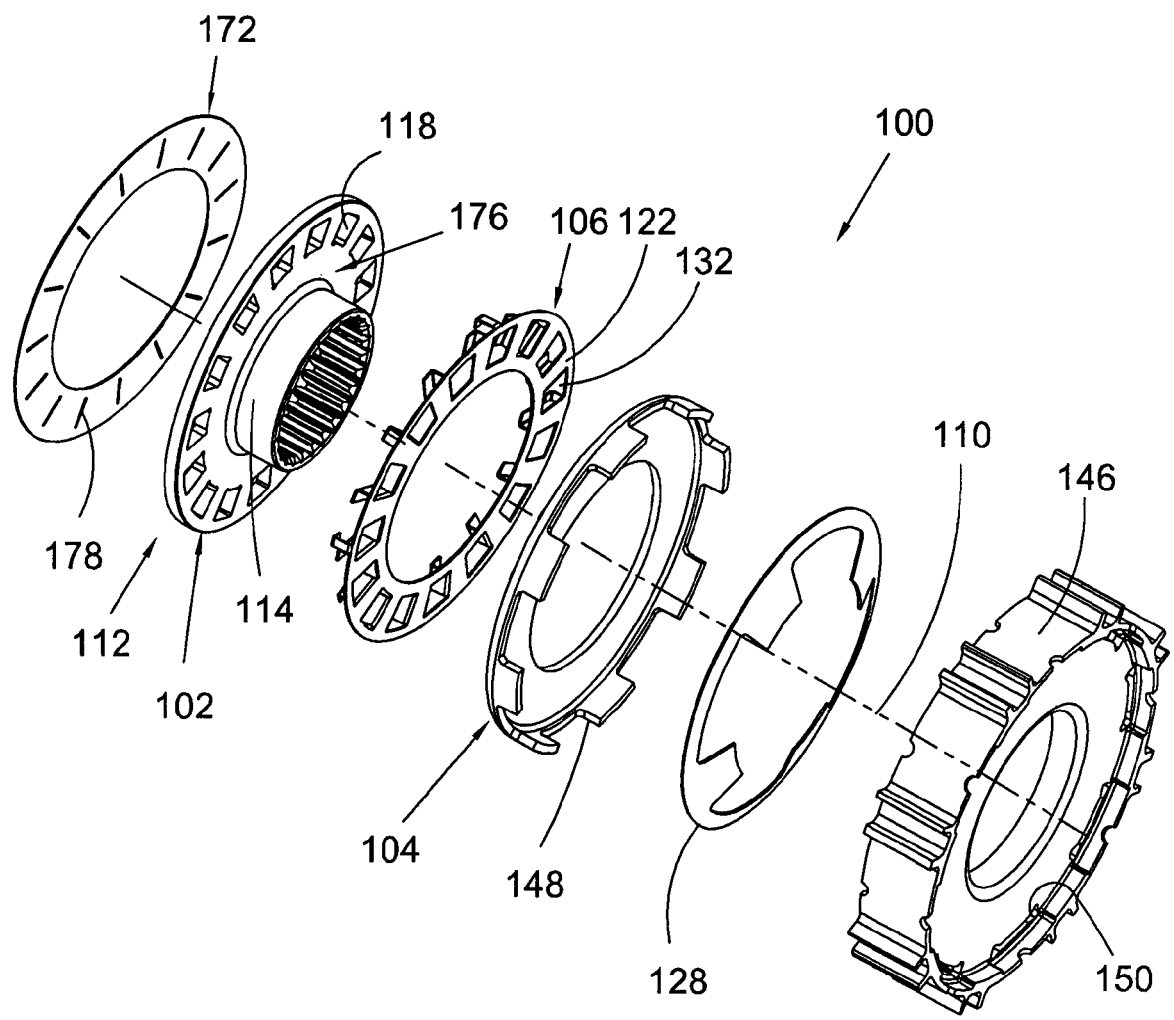
FIG. 2 is a front exploded view of the one-way clutch shown in FIG. 4.

FIG. 2 is a front exploded view of one-way clutch 100. The following should be viewed in light of FIGS. 1 and 2. In general, clutch 100 is part of a stator (not shown) in a torque converter (not shown).

Radially disposed elements 102 and 104, or plates 102 and 104, are arranged to lockingly engage when one of the plates rotates in a direction associated with a locking mode for the stator, for example, direction 108. The term "radially disposed element" refers to a component in the clutch that has at least portions that are substantially disc-like and substantially orthogonal to longitudinal axis 110. The component can be a full disc or can be an annular ring. Hereinafter, the terms "radially disposed element" and "plate" are used interchangeably. The locking arrangement in clutch 100, for example, the configuration of plates 102 and 104, can be formed by any means known in the art. In addition, in some aspects, at least portions of an axially engaging and disengaging one-way clutch mechanism for a torque converter as shown in commonly assigned U.S. Provisional Patent Application No. 60/710,828, titled "STATOR HAVING AN AXIALLY ENGAGING AND DISENGAGING ONE-WAY CLUTCH MECHANISM FOR A TORQUE CONVERTER," inventors Brees et al., filed Aug. 24, 2005, is used. The preceding discussion regarding the locking operation of a present invention clutch is applicable to other present invention clutches described infra, and for the sake of brevity, is not repeated infra.

Plates 102 and 104 are radially disposed with respect to longitudinal axis 110. In some aspects, plate 102 is part of hub 112. Since hub 112 is rotationally fixed to the stator shaft (not shown) by spline segment 114, plate 102 is rotationally fixed. That is, plate 102 is rotationally fixed with respect to axis 110 and cannot rotate about axis 110. Plate 102 can be integral with hub 112 or can be separately formed from the hub and joined to the hub by any means known in the art. Plate 104 is connected to blades (not shown) for the stator and rotates with the blades. In some aspects, protrusions 116 on plate 104 lockingly engage openings 118 in plate 102. However, it should be understood that this configuration can be reversed. For example, in some aspects (not shown), the rotationally fixed plate is formed with protrusions and the rotating plate is formed with openings.

As described supra, undesirable noise and vibration can occur during the transition from free-wheel mode to locking mode in a one-way clutch for a stator. Plate 106 is axially disposed between plates 102 and 104 and is arranged to dampen energy associated with the locking engagement of plates 102 and 104. In some aspects, the dampening is hydraulic. That is, hydraulic elements and/or functions are used to effect the dampening. For example, the torque converter including clutch 100 includes fluid (not shown) used to transfer torque and provide cooling. Plate 106 includes hydraulic dampening elements, or structures, 119 arranged to partially enclose a portion of the fluid in conjunction with plate 106. In some aspects, elements 119 include substantially radially disposed segments 120 axially displaced from plate 106. Segments 120 are arranged to partially enclose a portion of the fluid in conjunction with plate 106, in particular with main body 122. That is, segment 120 and body 122 form part of a pocket in which fluid is trapped. As further described below, the displacement of the trapped fluid provides dampening in a present invention hydraulically dampened clutch.

Plate 106 includes at least one substantially axially disposed segment 124 connected to main body 122 and segment 120. At least a portion of segments 124 is disposed in openings 118. Segment 124 forms a portion of the pocket noted above. Plate 104 is urged in direction 126 by resilient means 128. Resilient means 128 can be any means known in the art.

It should be appreciated that clutch 100 is not limited to the configuration shown. For example, plates 102 and 106 are not limited to the number, size, or configuration of openings 118 and 132, respectively, shown. Plate 104 is not limited to the number, size, or configuration of protrusions 116 shown. Segments 120 and 124 are not limited to the size, shape, or configuration shown. For example, a circumferential length of portion 120 and an axial length of segment 124 are not limited to any particular values. However, the axial length is typically correlated to axial thickness 140 of plate 102 and the circumferential length is correlated to circumferential width 142 of openings 118. Circumferential and axial lengths also are shown below (reference designators 236 and 238, respectively, in FIG. 4). The preceding discussion regarding the number, size, configuration, shape, or dimensions of plates, openings, protrusions, and in general, components of a present invention clutch, is applicable to other present invention clutches described infra, and for the sake of brevity, is not repeated infra.

Plates 102, 104, and 106 and hub 112 can be formed by any means known in the art. In some aspects, some or all of the plates and hub are stamped. Plate 104 can be connected to the blades of the stator by any means known in the art. In some aspects, connector 146 is used. Plate 104 is rotational fixed to connector 146 by tabs 148 inserted through openings 150 in the connector. The connector, in turn, is connected to the stator blades by channels 152. In addition, in some aspects (not shown), plate 104 is integral to the stator, for example, as described in the commonly assigned U.S. Provisional Patent Application titled "STATOR AND ONE-WAY CLUTCH ASSEMBLY FOR A TORQUE CONVERTER," inventors Hemphill et al., filed Mar. 24, 2006.

Figure 3:
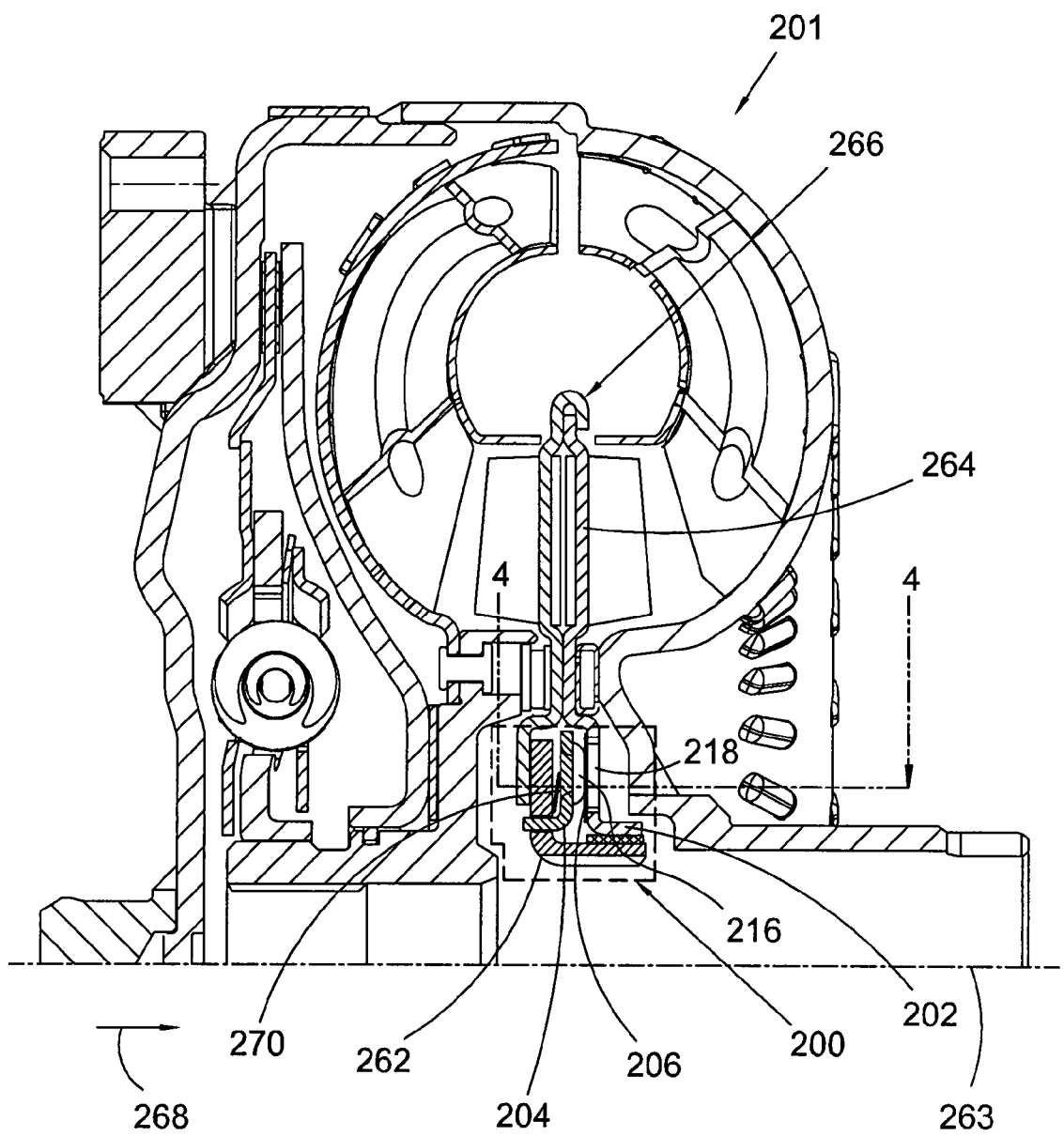
FIG. 3 is a partial cross-sectional view of a present invention three-plate one-way clutch, with hydraulic dampening, in a torque converter.

FIG. 3 is a partial cross-sectional view of present invention three-plate one-way clutch 200, with hydraulic dampening, in a torque converter.

Figure 4A:
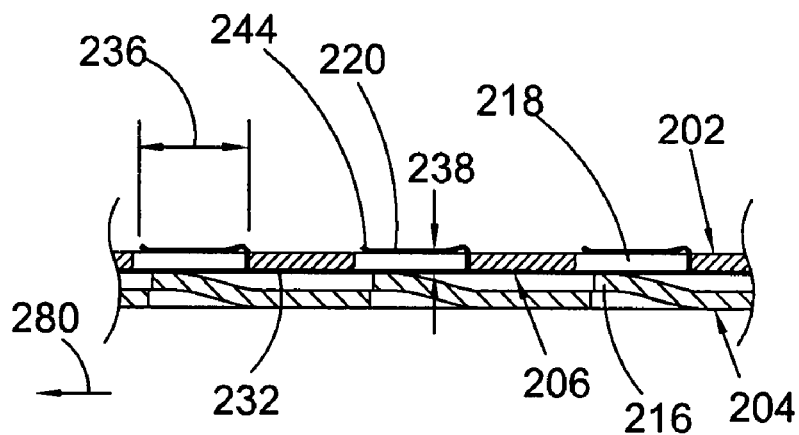
FIGS. 4A through 4C are partial cross-sectional views along line 4-4 in FIG. 3.
Figure 4B:
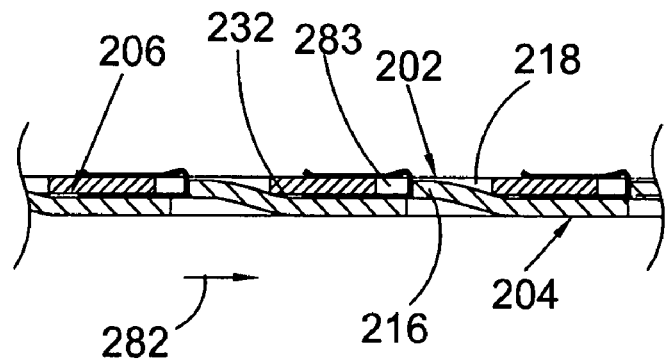
Figure 4C:
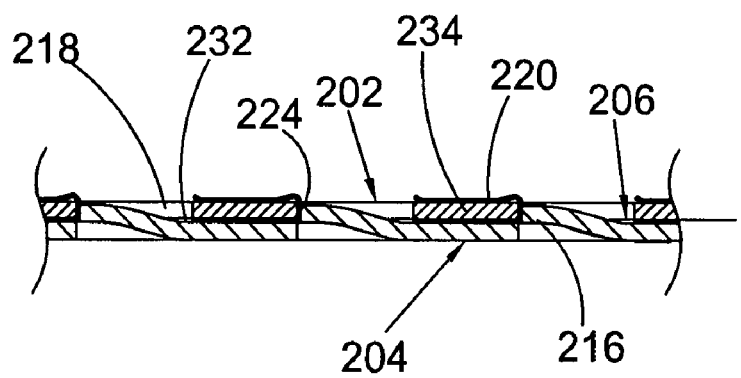

FIGS. 4A through 4C are partial cross-sectional views along line 4-4 in FIG. 3. The following should be viewed in light of FIGS. 3 through 4C. Plates 202, 204, and 206 are at least partially analogous in function to plates 102, 104, and 106, discussed in the description for FIG. 1. The functional description of plates 102 and 104 in FIG. 1 regarding freewheel and locking modes is substantially applicable to plates 202 and 204. Openings 218 and protrusions 216 are functionally analogous to openings 118 and protrusions 116, respectively, in FIG. 1. Plate 206 is axially disposed between plates 202 and 204 and includes openings 232 and segments 220 and 224, analogous to openings 132 and segments 120 and 124, respectively, in FIG. 1. In some aspects, segments 220 include flared portions 244. In clutch 200, plate 204 is rotationally fixed to hub 262 and hub 262 is rotationally locked to a stator shaft (not shown). Thus, plate 204 is rotationally fixed with respect to axis 263. Plate 202 is connected to rotatable element 264 of stator 266. Plate 204 is urged in direction 268 by resilient means 270. Resilient means 270 can be any means known in the art. That is, unlike clutch 100 in FIG. 1, the plate with the protrusions is rotationally locked and the plate with the openings rotates with the stator.

It should be understood that a present invention clutch can be formed with the rotating plate having receiving elements, such as openings and the fixed plate having protrusions, or a present invention clutch can be formed with the fixed plate having receiving elements, such as openings and the rotating plate having protrusions.

In FIG. 4A, clutch 200 is in free-wheel mode (plate 202 rotates in direction 280). Portions 234 of plate 202 engage segments 224 and plate 206 also rotates in direction 280. Intermediate plate 206 slides over plate 204 and protrusions 216 such that protrusions 216 do not engage openings 218. In FIG. 4B, the clutch switches to a locking mode and plate 202 rotates in direction 282. As this rotation occurs, openings 232 begin to align with openings 218. Plate 206 rotates such that openings 208 and 232 align sufficiently to enable protrusions 216 to drop into openings 218. As the protrusions drop into openings 218, segments 224 engage the protrusions.

In FIG. 4C, portions 234 rotate into segments 224 to lockingly engage plates 202 and 204. To enable portions 234 to rotate toward segments 224, fluid trapped in the pockets, for example, pocket 283, formed by plates 202 and 206, in particular by portions 234, the main body of plate 202, and segments 220 and 224, must be displaced. Energy or inertia associated with plate 202 provides the force to displace the fluid. As the energy of plate 202 displaces the fluid, portions 234 are brought into contact with segments 224, that is, plates 202 and 204 are rotationally locked. Advantageously, the energy or force associated with plate 202 is dissipated as the fluid is displaced and the rotational velocity of plate 202 diminishes. Thus, the inertia or energy of plate 202 is sufficiently attenuated such that the magnitude of the vibration and noise associated with the engagement of plates 204 and 202, that is, the contact between portions 234 and segments 224 is appreciably reduced. Alternately stated, the displacement of the fluid acts as a brake on plate 202.

Figure 5:
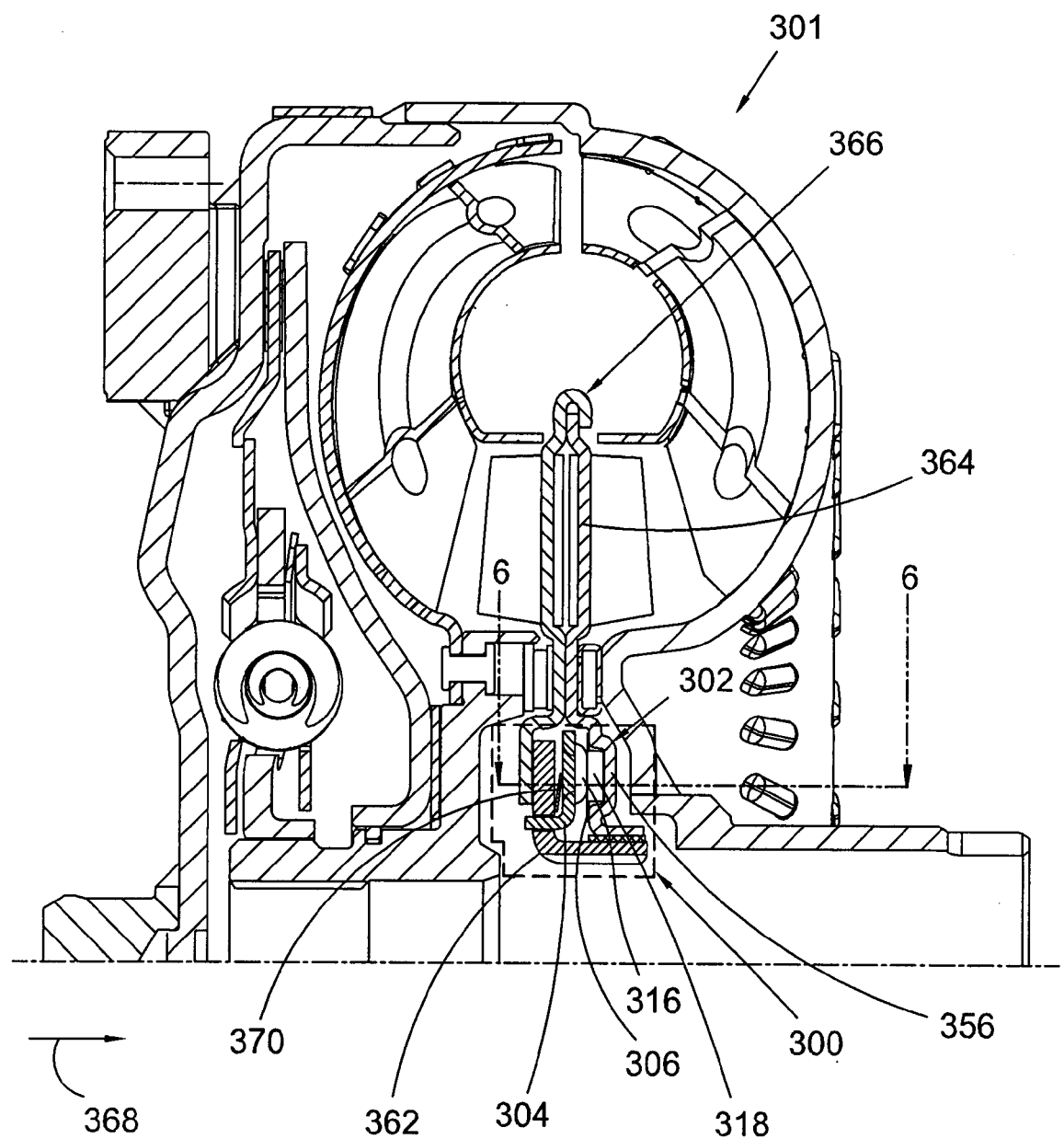
FIG. 5 is a partial cross-sectional view of a present invention three-plate one-way clutch, with hydraulic dampening, in a torque converter.

FIG. 5 is a partial cross-sectional view of present invention three-plate one-way clutch 300 in torque converter 301 with hydraulic dampening.

Figure 6A:
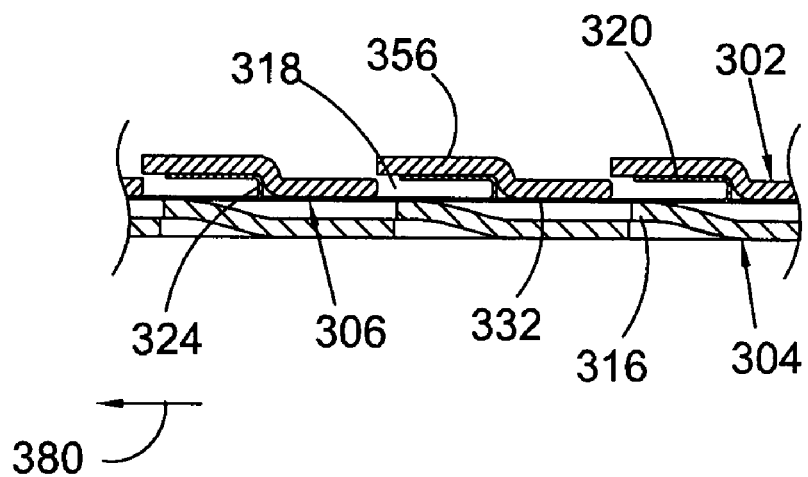
FIGS. 6A through 6C are partial cross-sectional views along line 6-6 in FIG. 5.
Figure 6B:
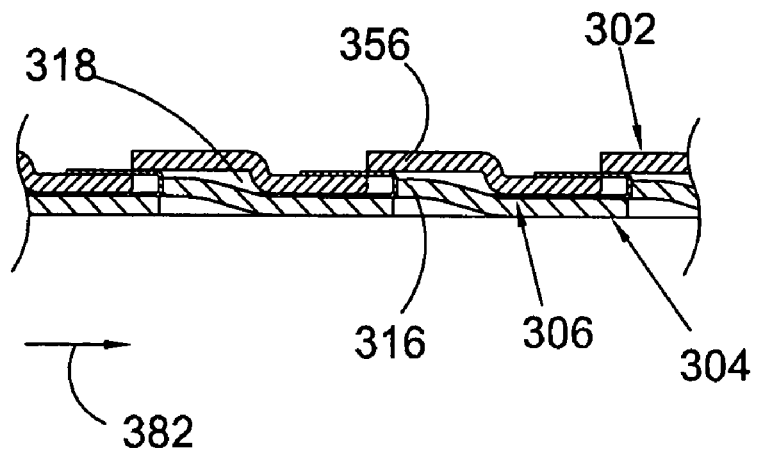
Figure 6C:
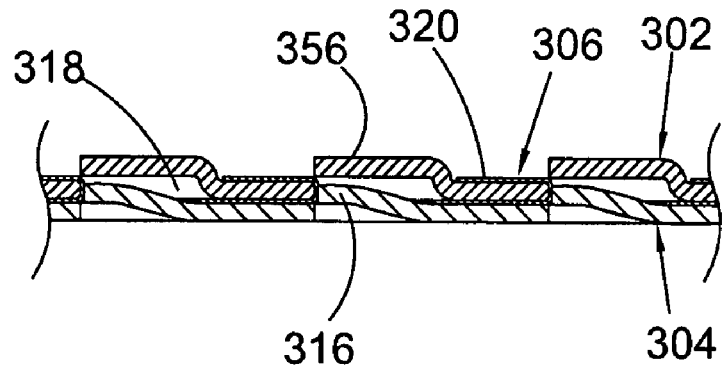

FIGS. 6A through 6C are partial cross-sectional views along line 6-6 in FIG. 5. The following should be viewed in light of FIGS. 5 through 6C. Plates 302, 304, and 306 are at least partially analogous in function to plates 202, 204, and 206, discussed in the respective descriptions for FIGS. 3 through 4C. The functional description of plates 102 and 104 in FIG. 1 regarding free-wheel and locking modes is substantially applicable to plates 302 and 304. Openings 318 and protrusions 316 are analogous to openings 218 and protrusions 216, respectively, in FIGS. 3 through 4C. Plate 306 is axially disposed between plates 302 and 304 and includes openings 332 and segments 320 and 324, analogous to openings 232 and segments 220 and 224, respectively, in FIGS. 3 through 4C. Plate 302 includes segments 356. Plate 304 is rotationally fixed to hub 362 and hub 362 is rotationally locked to a stator shaft (not shown). Plate 302 is connected to rotatable element 364 of stator 366. Plate 304 is urged in direction 368 by resilient means 370. Resilient means 370 can be any means known in the art.

In some aspects, segments 320 and 324 of plate 306 and segments 356 are complimentarily formed. Segments 356 restrict the openings through which fluid in the pockets formed by plates 302 and 306 can be displaced. Thus, the resistance offered by the fluid increases, increasing the amount of energy from plate 302 required to overcome the resistance, and thereby further dampening the engagement of plates 302 and 304. The discussion in the description of FIGS. 3A through 4C regarding the operation of clutch 200 is substantially applicable to the operation of clutch 300 as shown in FIGS. 6A through 6C, and for the sake of brevity is not repeated here.

Figure 7:
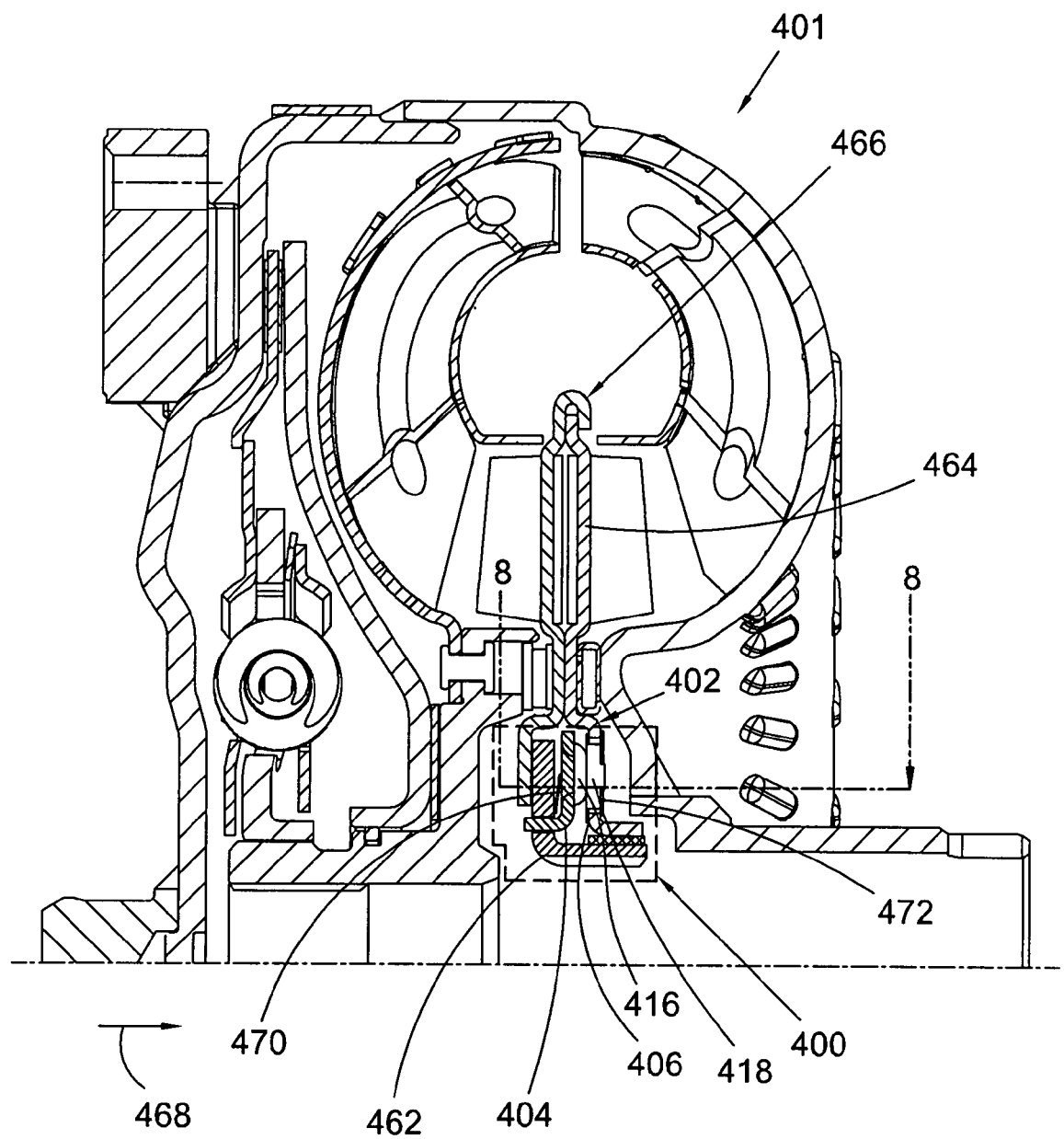
FIG. 7 is a partial cross-sectional view of a present invention four-plate one-way clutch, with hydraulic dampening, in a torque converter.

FIG. 7 is a partial cross-sectional view of present invention four-plate one-way clutch 400, with hydraulic dampening, in torque converter 401.

Figure 8A:
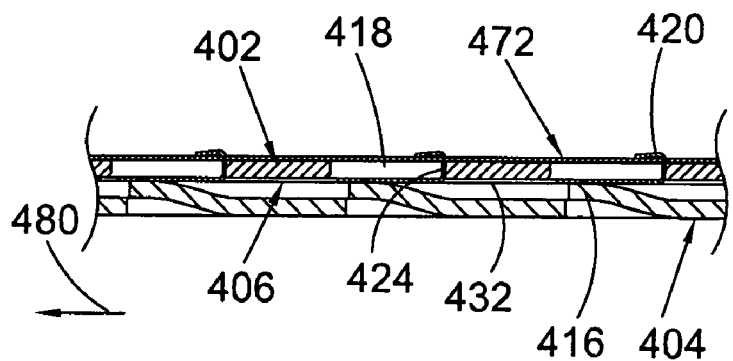
FIGS. 8A through 8C are partial cross-sectional views along line 8-8 in FIG. 7.
Figure 8B:
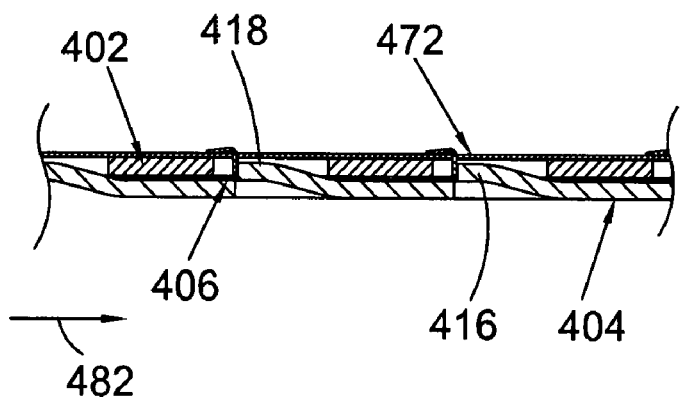
Figure 8C:
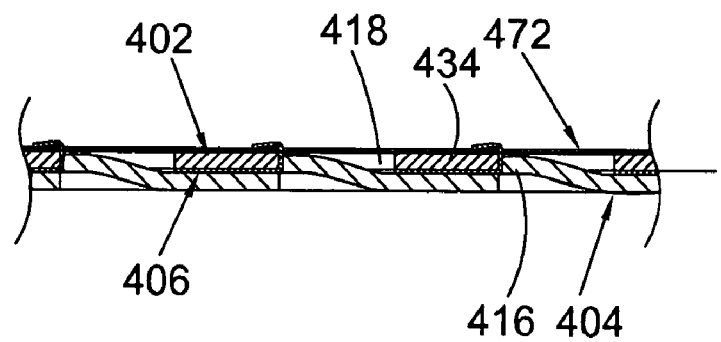

FIGS. 8A through 8C are partial cross-sectional views along line 8-8 in FIG. 7. The following should be viewed in light of FIGS. 7 through 8C. Plates 402, 404, and 406 are at least partially analogous to plates 202, 204, and 206, discussed in the respective descriptions for FIGS. 3 through 4C. The functional description of plates 102 and 104 in FIG. 1 regarding free-wheel and locking modes is substantially applicable to plates 402 and 404. Openings 418 and protrusions 416 are analogous to openings 218 and protrusions 216, respectively, in FIGS. 3 through 4C. Plate 406 is axially disposed between plates 402 and 404 and includes openings 432 analogous to openings 232 in FIGS. 3 through 4C.

Plate 404 is rotationally fixed to hub 462 and hub 462 is rotationally locked to a stator shaft (not shown). Plate 402 is connected to rotatable element 464 of stator 466. Plate 404 is urged in direction 468 by resilient means 470. Resilient means 470 can be any means known in the art.

Clutch 400 includes a fourth plate, plate 472. Returning to FIGS. 1 and 2, in some aspects, clutch 100 includes a fourth plate, plate 172, analogous to plate 472. The axial positioning of a fourth plate and the functionality of the fourth plate is described with respect to FIG. 1 and 2, however, it should be understood that the description is applicable to FIG. 7. Plate 172 is disposed proximate side 174 of plate 102. Plate 106 is disposed proximate side 176 of plate 102. Plates 106 and 172 are engaged or connected such that plate 172 at least partially blocks openings 118. In some aspects, plate 172 includes openings 178, at least a portion of segment 124 is disposed in openings 178, and segments 120 and 124 are engaged with plate 172. Thus, in some aspects, clutch 100 is formed by configuring segment 120 to extend in a same plane as segment 124, inserting segments 120 and 124 through respective openings 118 and 178 and folding segment 120 over plate 178. It should be understood that a present invention clutch is not limited to the configuration shown for a fourth plate, blocking openings. For example, in some aspects (not shown), plate 172 is directly connected to or engaged with plate 102. That is, plates 106 and 172 are not connected one to the other.

As discussed supra, plates 102 and 106 form pockets to trap torque converter fluid. Without plate 172, the portion of the pockets on axial side 174 of plate 102 is formed by segments 120 of plate 106. Returning to FIGS. 8A through 8C, a portion of the pockets is formed by plate 472. Plate 472 provides a more continuous boundary for the pockets than segments 120 in FIG. 1. That is, the openings of the pockets are reduced, restricting the passage of fluid out of the pockets. As a result, greater force is required to displace the fluid trapped in the pockets, dissipating more of the energy of plate 402, and further attenuating the noise and vibration associated with the engagement of plates 402 and 404. Alternately stated, portions 434 encounter more resistance as they enter the pockets and more energy from the plate is needed to overcome the resistance. It should be understood that the shape, position, and configuration of plates 172 and 472 can be modified to vary the amount of blockage provided by the plates or to vary the location of the blockage or openings provided by the plates.

In general, the operation discussed for clutch 200 in FIGS. 4A through 4C is applicable to clutch 400 and FIGS. 8A through 8B. In FIG. 8A, clutch 400 is in free-wheel mode (plate 402 rotates in direction 480). Portions 434 of plate 402 engage segments 424 and plate 406 also rotates in direction 480. Intermediate plate 406 slides over plate 404 and protrusions 416 such that protrusions 416 do not engage openings 418. In FIG. 8B, the clutch switches to a locking mode and plate 402 rotates in direction 482. As this rotation occurs, openings 432 begin to align with openings 418. Plate 406 rotates such that openings 408 and 432 align sufficiently to enable protrusions 416 to drop into openings 418. As the protrusions drop into openings 418, segments 424 engage the protrusions.

In FIG. 8C, portions 434 rotate into segments 424 to lockingly engage plates 402 and 404. To enable portions 434 to rotate toward segments 424, fluid trapped in the pockets formed by plates 402, 406, and 472 must be displaced. Energy or inertia associated with plate 402 provides the force to displace the fluid. As the energy of plate 402 displaces the fluid, portions 434 are brought into contact with segments 424, that is, plates 402 and 404 are rotationally locked. The fluid is displaced by the movement of portions 434, dissipating energy or inertia associated with plate 402. Thus, the inertia or energy of plate 402 is sufficiently attenuated such that the magnitude of the vibration and noise associated with the engagement of plates 402 and 404, that is, the contact between segments 424 and portions 434, is appreciably reduced.

Figure 9:
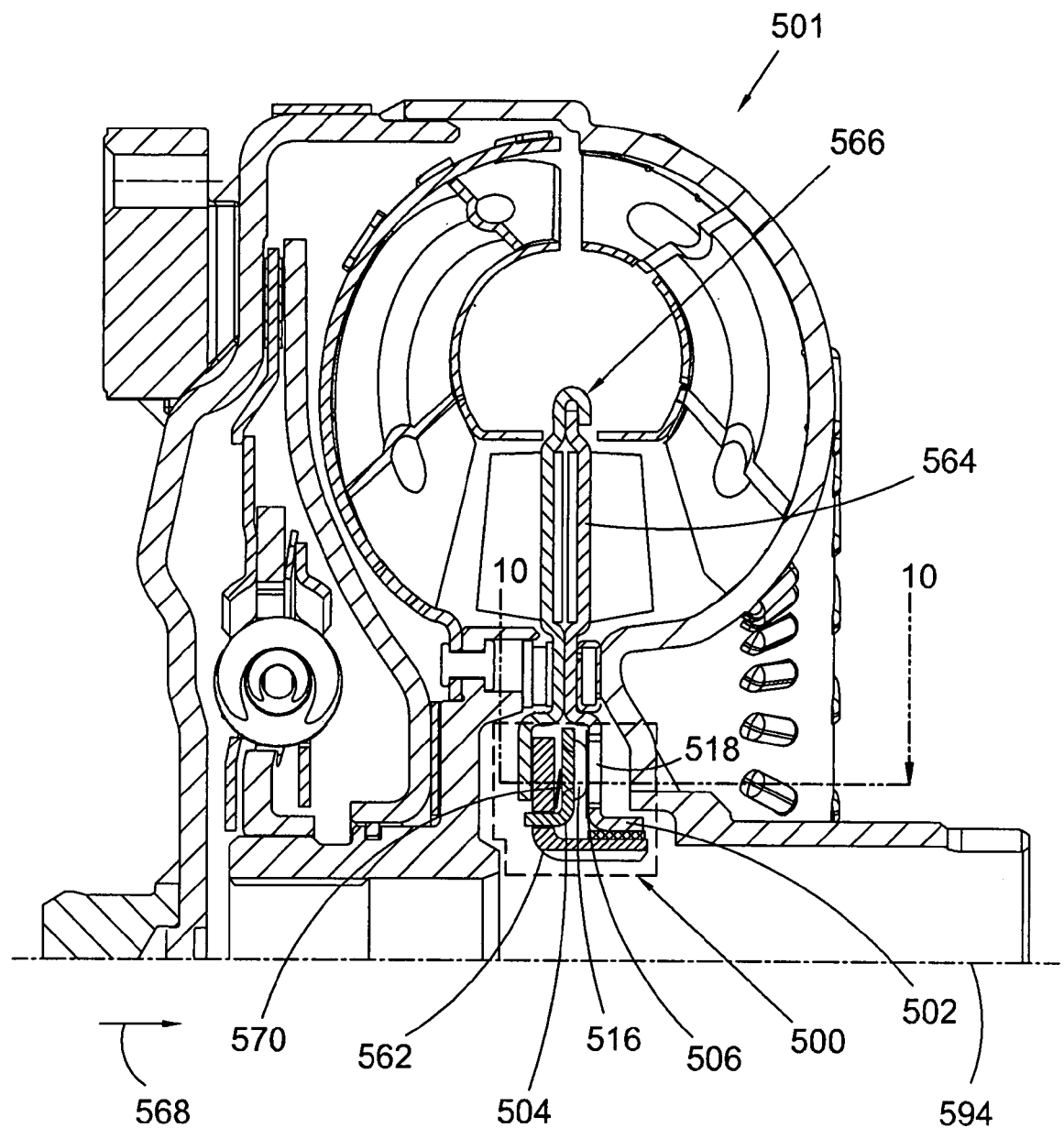
FIG. 9 is a partial cross-sectional view of a present invention three-plate one-way clutch, with mechanical dampening, in a torque converter.

FIG. 9 is a partial cross-sectional view of present invention three-plate one-way clutch 500, with mechanical dampening, in torque converter 501.

Figure 10A:
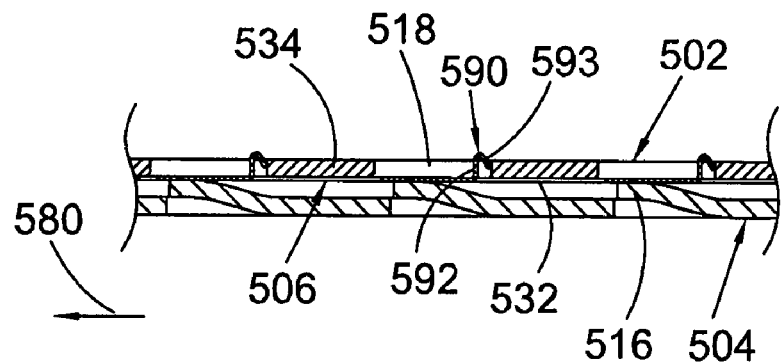
FIGS. 10A through 10C are partial cross-sectional views along line 10-10 in FIG. 9.
Figure 10B:
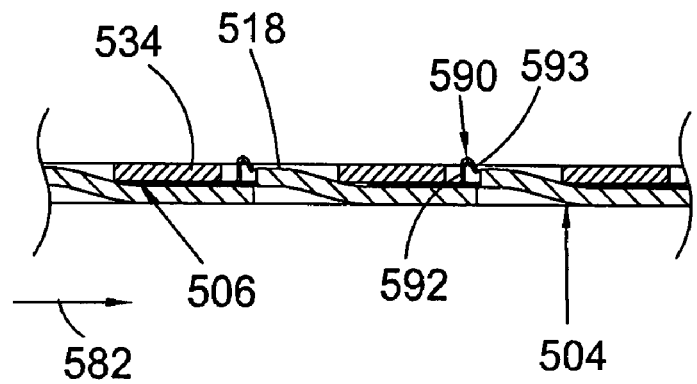
Figure 10C:
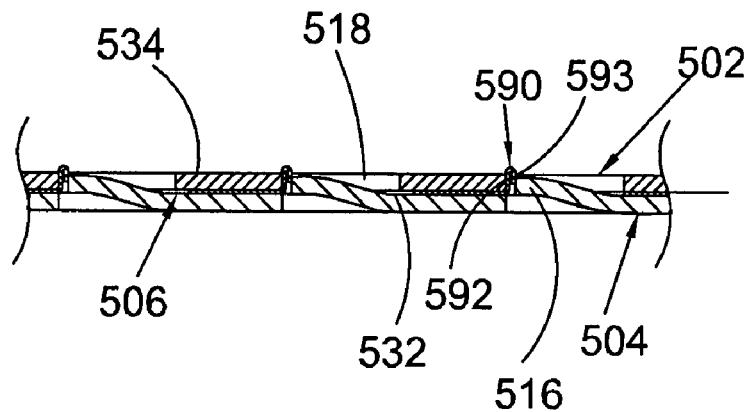

FIGS. 10A through 10C are partial cross-sectional views along line 10-10 in FIG. 9. The following should be viewed in light of FIGS. 9 through 10C. In some aspects, a present invention clutch uses mechanical means to dampen the energy associated with the transition from free-wheel mode to locking mode. For example, an elastically deformable element is arranged to engage the locking plates of the clutch. Clutch 500 includes plates 502, 504, and 506, at least partially analogous to plates 202, 204, and 206 in FIGS. 3 through 4C. Plate 502 includes openings 518 and portions 534 and plate 504 includes protrusions 516. Openings 518, segments 534, and protrusions 516 are analogous to openings 218, portions 234, and protrusions 216, respectively, in FIGS. 3 through 4C. Plate 506 is axially disposed between plates 502 and 504 and includes openings 532. Openings 532 are analogous to openings 232 in FIGS. 3 through 4C. The functional description of plates 102 and 104 in FIG. 1 regarding free-wheel and locking modes is substantially applicable to plates 502 and 504. To mechanically dampen the engagement of plates 502 and 504, plate 506 includes elastically deformable extensions 590. Extensions 590 include axial segments 592 and wing segments 593. Segments 593 are deformable as described below.

Plate 504 is rotationally fixed to hub 562 and hub 562 is rotationally locked to a stator shaft (not shown). Plate 502 is connected to rotatable element 564 of stator 566. Plate 504 is urged in direction 568 by resilient means 570. Resilient means 570 can be any means known in the art.

In FIG. 10A, clutch 500 is in free-wheel mode (plate 502 rotates in direction 580). Portions 534 of plate 502 engage segments 593 and plate 506 also rotates in direction 580. Intermediate plate 506 slides over plate 504 and protrusions 516 such that protrusions 516 do not engage openings 518. In FIG. 10B, the clutch switches to a locking mode and plate 502 rotates in direction 582. As this rotation occurs, openings 532 begin to align with openings 518. Plate 506 rotates such that openings 508 and 532 align sufficiently to enable protrusions 516 to drop into openings 518. As the protrusions drop into openings 518, segments 593 engage the protrusions and plate 506 rotationally locks with plate 504.

In FIG. 10C, portions 534 rotate into segments 592. To enable portions 534 to rotate toward the protrusions, the resistance of extensions 590 must be overcome, that is, segment 592 must be pushed against segment 593. Energy or inertia associated with plate 502 provides the force to overcome the resistance, that is, to compress extensions 590. Advantageously, the energy or force associated with plate 502 is dissipated as extensions 590 are compressed and the rotational velocity of plate 502 diminishes. Thus, the inertia or energy of plate 502 is sufficiently attenuated such that the magnitude of the vibration and noise associated with the engagement of plates 502 and 504 is appreciably reduced.

It should be understood that extensions 590 are not limited to the configurations, shapes, orientations, sizes, or number shown in FIGS. 10A-10C and that other configurations, shapes, orientations, sizes, or numbers are included within the spirit and scope of the invention as claimed.

Figure 11A:
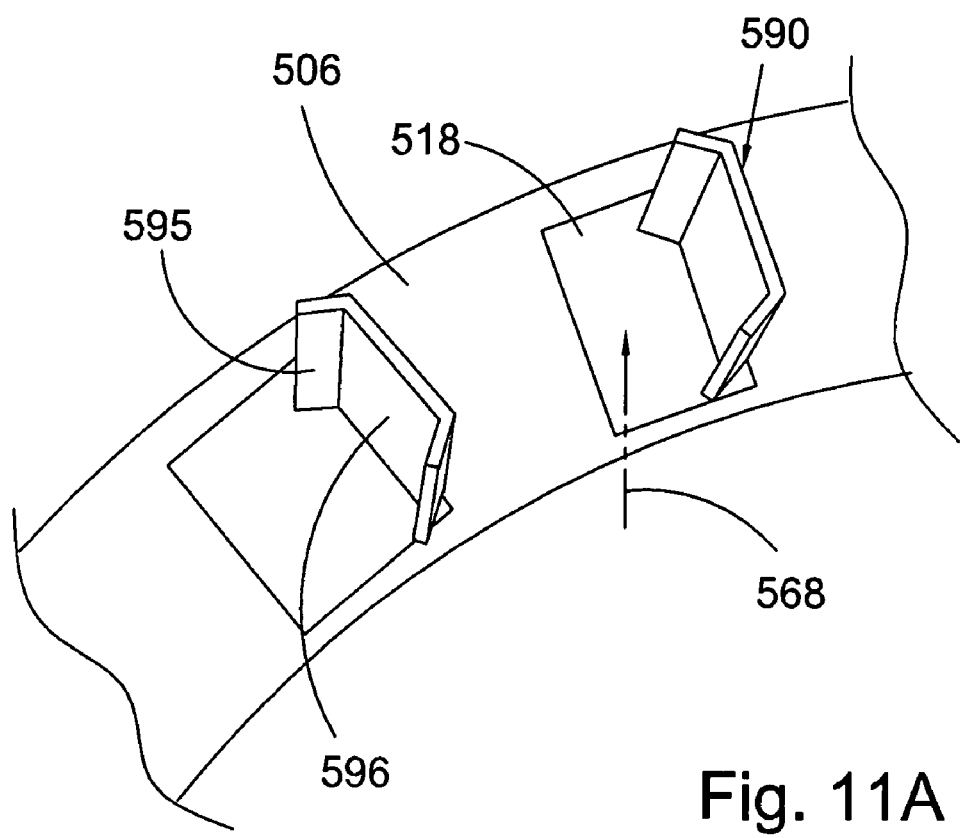
FIGS. 11A and 11B are partial perspective back views of an intermediate plate and elastically deformable elements in the clutch shown in FIG. 9.
Figure 11B:
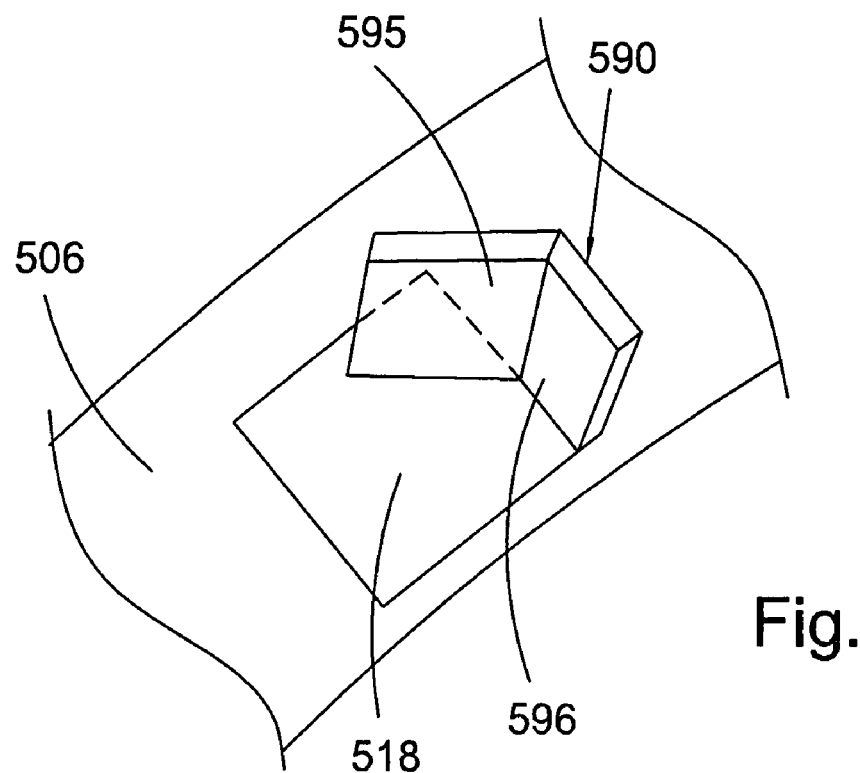

FIGS. 11A and 11B are partial perspective back views of intermediate plate 506 and elastically deformable elements 590 in clutch 500. The following should be viewed in light of FIGS. 9 through 11B. FIGS. 11A and 11B show a different configuration and orientation of extensions 590. Extensions 590 in FIGS. 10A through 10C are formed such that the extension is folded along a substantially radial line with respect to axis 594. For example, in FIG. 10A, segments 593 are formed by folding extensions 590 along such a radial line. However, to form segments 595 and 596, extension 590 is folded along a substantially axial line. The dampening operation of clutch 500 with segments 595 is substantially the same as that described for FIGS. 10A through 10C.

Figure 12A:
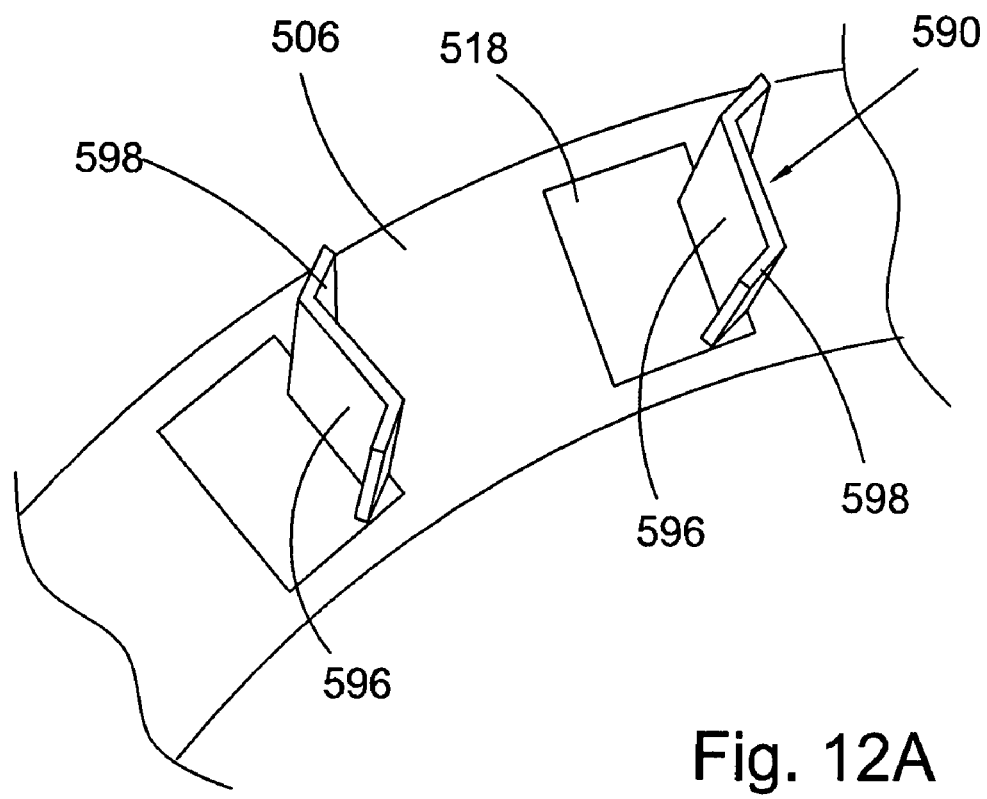
FIGS. 12A and 12B are partial perspective back views of an intermediate plate and elastically deformable elements in the clutch shown in FIG. 9; and, FIGS. 13A through 13C are partial cross-sectional views of a one-way clutch without dampening.
Figure 12B:
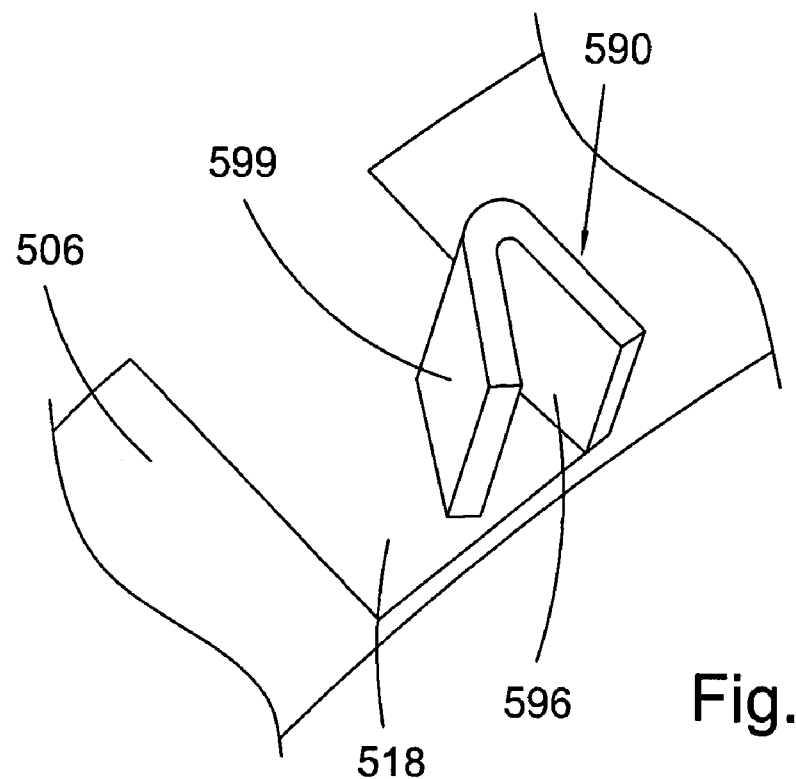
Figure 13A:
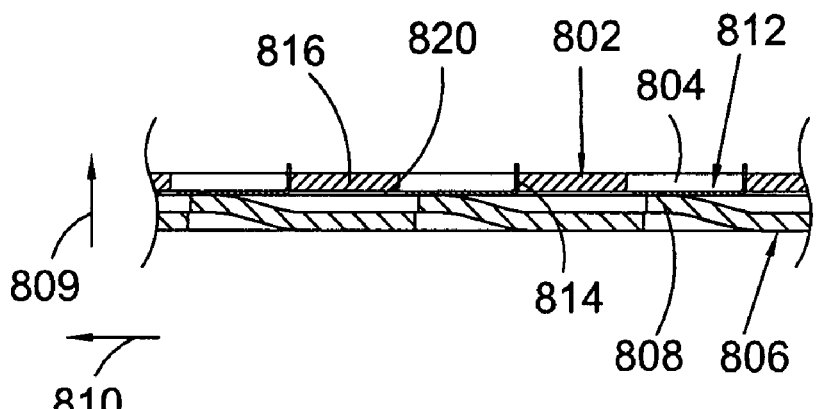
Figure 13B:
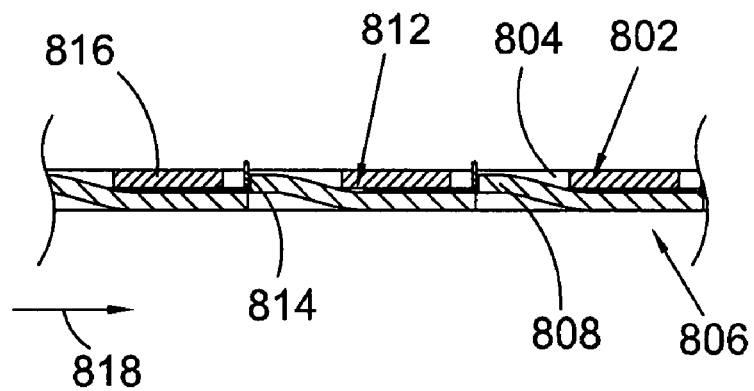
Figure 13C:
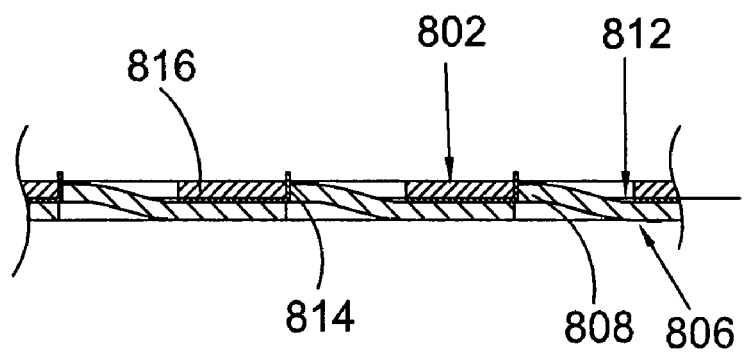

FIGS. 12A and 12B are partial perspective back views of intermediate plate 506 and elastically deformable elements 590 in clutch 500. It should be understood that extensions 590 are not limited to the configurations, shapes, orientations, sizes, or number shown in FIGS. 11A and 11B, and that other configurations, shapes, orientations, sizes, and numbers are included within the spirit and scope of the invention as claimed. For example, in some aspects, extensions 590 are configured as shown in FIGS. 12A and 12B. FIG. 12A shows extension 590 in an "S" configuration with portions 598 tensioned with respect to portion 596 to provide resistance to plate 502. FIG. 12B shows extension 590 with portions 599 in a "hook" configuration.

It should be understood that the alignment configurations for elastically deformable extensions shown in FIGS. 10A through 12B can be combined in a same present invention clutch. For example, for a same plate 506, a portion of the extensions can be configured as shown for extensions 590 in FIGS. 10A through 10C and a portion of the extension can be configured as shown for extensions 590 in FIGS. 11A and 11B or 12A and 12B.

It also should be understood that hydraulic and mechanical dampening can be combined in a same present invention clutch. For example, for a same axially intermediate plate (for example, plate 106 in FIG. 1), hydraulic dampening elements 119 and elastically deformable extensions, such as extensions 590 in FIG. 10A, can be used. Further, a fourth plate, such as plate 172 in FIG. 1 can be used with a present invention clutch including elastically deformable extensions.

Plates 202/302/402/502, 204/304/404/504, and 206/306/406/506 and hubs 262/362/462/562 can be formed by any means known in the art. In some aspects, some or all of the plates and hub are stamped. Plates 202/302/402/502 can be connected to the blades (not shown) of the stator by any means known in the art. In addition, in some aspects, plates 202/302/402/502 are integral to the stator, for example, as described in the commonly assigned U.S. Provisional Patent Application titled "STATOR AND ONE-WAY CLUTCH ASSEMBLY FOR A TORQUE CONVERTER," inventors Hemphill et al., filed Mar. 24, 2006.

It also should be understood that a present invention one-way clutch is not limited to use with any particular torque converter. For example, a present invention clutch is not limited to use with the torque converters shown in the figures.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A one-way clutch in a stator for a torque converter, comprising:
    a first radially disposed element rotationally fixed with respect to a longitudinal axis for said stator and including first and second oppositely facing surfaces disposed parallel to the longitudinal axis, and a plurality of openings open at each of the first and second surfaces;
    a second radially disposed element rotatable about said axis and arranged to lockingly engage with said first element in a first rotational direction; and,
    a third radially disposed element rotatable about said axis, axially disposed between said first and second elements, and arranged to dampen energy associated with said locking engagement, wherein the third radially disposed element includes a plurality of protrusions that extend through the plurality of openings.

2. The clutch of claim 1 wherein said third radially disposed element is arranged to provide hydraulic dampening.

3. The clutch of claim 2 wherein said torque converter includes fluid, said third element comprises a substantially radially disposed segment axially displaced from said third element and arranged to partially enclose a portion of said fluid in conjunction with said third element, and said second element is arranged such that said rotation of said second element in said first direction causes substantial displacement of said portion of said fluid during said engagement.

4. The clutch of claim 3 wherein one of said first or second elements further comprises at least one first opening and first and second axially-facing sides, a portion of said third element is disposed in said at least one first opening, said third element is proximate said first axially-facing side, and said radially disposed segment is proximate said second axially-facing side.

5. The clutch of claim 3 further comprising: a fourth radially disposed element; and, wherein a second one of said first or second elements further comprises at least one second opening and said fourth element at least partially blocks said at least one second opening.

6. The clutch of claim 5 wherein said fourth radially disposed element is connected to said third element.

7. The clutch of claim 5 wherein said second one of said first or second elements further comprises third and fourth axially-facing sides, said third element is disposed proximate said third axially-facing side, and said fourth element is disposed proximate said fourth axially-facing side.

8. The clutch of claim 5 wherein said fourth element further comprises at least one third opening, said third element further comprises at least one tab, and said at least one tab is disposed in said at least one third opening.

9. The clutch of claim 5 wherein said fourth element is formed by stamping.

10. The clutch of claim 1 wherein said third radially disposed element is arranged to provide mechanical dampening.

11. The clutch of claim 10 wherein said third element further comprises at least one elastically deformable extension and said second element is arranged such that said rotation of said second element in said first direction causes said first and second elements to compress said at least one elastically deformable extension.

12. The clutch of claim 11 wherein said first element further comprises at least one fourth opening with a first side and said second element is arranged to urge said at least one elastically deformable extension against said first side.

13. The clutch of claim 11 wherein said second element further comprises at least one fifth opening with a second side and said second side is arranged to urge said at least one elastically deformable extension against said first element.

14. The clutch of claim 1 wherein at least one of said first, second, and third elements is formed by stamping.

15. A one-way clutch in a stator for a torque converter, comprising:
    a first radially disposed element with at least one;
    a second radially disposed element with at least one protrusion arranged to lockingly engage with said first element in a first rotational direction; and,
    a third radially disposed element, said third element rotatable about a longitudinal axis for said stator, axially disposed between said first and second plates, and arranged to provide hydraulic dampening of energy associated with said engagement, wherein said third element forms a structure partially enclosing a portion of fluid in said torque converter, one of said first or second elements is rotationally fixed with respect to said axis, the other of said first or second elements is rotatable about said axis, and said rotation of said other is arranged to substantially displace said portion of said fluid during said engagement and wherein the structure includes respective first, second, and third walls formed by the third element and respective fourth walls formed by one of the first or second radially disposed elements and wherein the first, second, third, and fourth walls are at a same distance from the longitudinal axis.

16. A one-way clutch in a stator for a torque converter, comprising:
    a first radially disposed element with at least one opening;

a second radially disposed element with at least one protrusion arranged to lockingly engage with said first element in a first rotational direction;

a third radially disposed element, said third element rotatable about a longitudinal axis for said stator, axially disposed between said first and second plates, and arranged to provide hydraulic dampening of energy associated with said engagement; and, a fourth radially disposed element, wherein said fourth element is connected to said third element such that said fourth element at least partially blocks said at least one opening, one of said first or second elements is rotationally fixed with respect to said axis, the other of said first or second elements is rotatable about said axis, and said rotation of said other is arranged to substantially displace said portion of said fluid disposed between said third and fourth elements during said engagement.

17. A one-way clutch in a stator for a torque converter, comprising:

a first radially disposed element with at least one opening;

a second radially disposed element with at least one protrusion arranged to lockingly engage with said first element in a first rotational direction; and, a third radially disposed element, said third element rotatable about a longitudinal axis for said stator, axially disposed between said first and second plates, and arranged to provide mechanical dampening of energy associated with said engagement, wherein said third element comprises at least one elastically deformable extension, one of said first or second elements is rotationally fixed with respect to said axis, the other of said first or second elements is rotatable about said axis, and said rotation of said other is arranged to cause said first and second elements to compress said at least one elastically deformable extension.

18. A one-way clutch in an automotive drive component, comprising:

a first radially disposed element rotationally fixed with respect to an axis for said component and with at least one first locking feature including a first surface substantially parallel to the axis;

a second radially disposed element rotatable about said axis and with at least one second locking feature including a second surface substantially parallel to the axis; and, a third radially disposed element rotatable about said axis and axially disposed between said first and second elements and including a plurality of protrusions extending parallel to the axis, wherein said first and second at least one locking features are arranged to lockingly engage in a first rotational direction to rotationally lock said first and second elements in said first rotational direction, and wherein during the locking engagement of the first and second element the plurality of protrusions are compressed between the first and second surfaces to mechanically dampen the locking engagement of said first and second at least one locking features.

19. The clutch of claim 18 wherein said third element further comprises at least one elastically deformable extension and said second element is arranged such that said rotation of said second element in said first direction causes said first and second elements to compress said at least one elastically deformable extension.

20. The clutch of claim 19 wherein said first element further comprises at least one first opening with a first side and said second element is arranged to urge said at least one elastically deformable extension against said first side.

21. The clutch of claim 19 wherein said second element further comprises at least one second opening with a second side and said second side is arranged to urge said at least one elastically deformable extension against said first element.

22. The clutch of claim 18 wherein said third element further comprises at least one elastically deformable extension and said first and second elements are arranged to compress said at least one extension.

* * * * *